United States Patent [19]

Georgallis

[11] 4,267,585
[45] May 12, 1981

[54] DEVICE FOR DETERMINING THE CONFIGURATION AND CALIBRATING LONG, TOWED UNDERWATER STRUCTURES

[75] Inventor: Peter C. Georgallis, Herndon, Va.

[73] Assignee: Ramcor, Inc., Vienna, Va.

[21] Appl. No.: 84,660

[22] Filed: Oct. 15, 1979

[51] Int. Cl.³ .............................................. H04R 29/00
[52] U.S. Cl. ........................................ 367/13; 367/19; 367/130; 73/712
[58] Field of Search .................... 367/13, 19, 106, 130

[56] References Cited

U.S. PATENT DOCUMENTS

| | | | |
|---|---|---|---|
| 3,859,620 | 1/1975 | Percy | 367/13 |
| 3,864,664 | 2/1975 | Trott et al. | 367/13 |
| 3,905,007 | 9/1975 | Koesy | 367/106 X |
| 3,944,966 | 3/1976 | Rubega | 367/13 X |
| 3,953,827 | 4/1976 | Moal et al. | 367/19 |
| 4,037,189 | 7/1977 | Bell et al. | 367/130 X |
| 4,091,356 | 5/1978 | Hutchins | 367/130 X |
| 4,121,190 | 10/1978 | Edgerton et al. | 367/106 |

Primary Examiner—Richard A. Farley
Attorney, Agent, or Firm—James J. Brown

[57] ABSTRACT

A device is described for determining the characteristic configuration of long, towed underwater structures such as tubes or cables. The device is a collar which fits around the structure and has sufficient hydrodynamic drag that it remains essentially stationary relative to the linear configuration of the structure as the structure is drawn through it. The device, however, has relatively low mass and assumes the horizontal and vertical position of the structure as the structure is drawn through it. Instrumentation within the device registers the position assumed by the collar and either records it or transmits it to an external receiving station. This information gives a characteristic profile of the elongated structure as it passes through the water.

9 Claims, 9 Drawing Figures

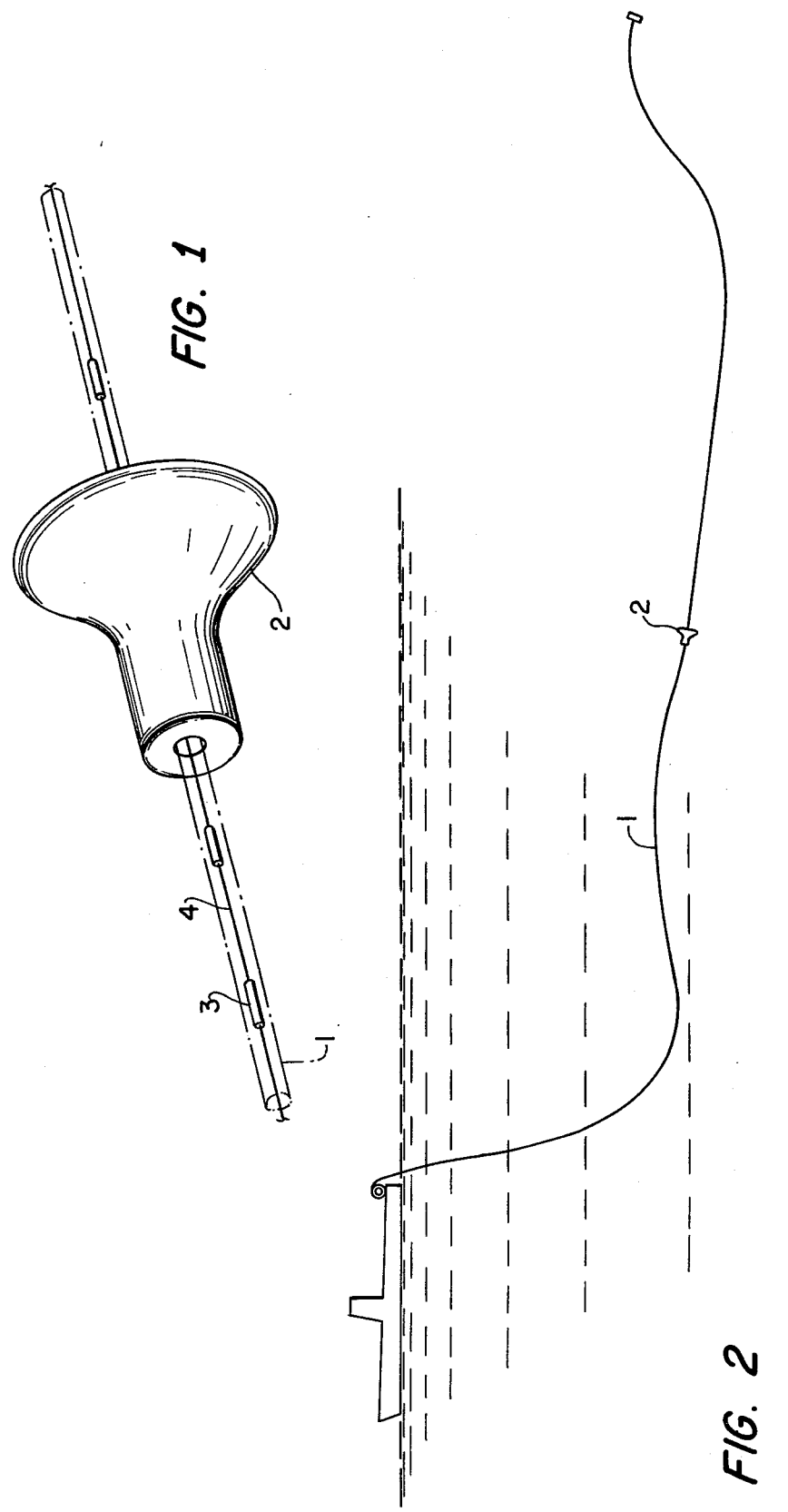

DEVICE FOR DETERMINING THE CONFIGURATION AND CALIBRATING LONG, TOWED UNDERWATER STRUCTURES

BACKGROUND OF THE INVENTION

The present invention is directed to a system for determining the configuration of long towed underwater cables and for calibrating and determining the characteristics of measuring devices which may be displayed along the cable. The present invention is particularly adapted for determining the vertical and horizontal displacement which characterizes long towed arrays and for determining the response characteristics of hydrophones and depth sensors along the array.

A particularly useful system which has been employed for identifying the presence and location of underwater objects has been the long towed array, which essentially consists of a long oil filled tube having dispersed at regular intervals along its length a series of hydrophone elements which detect the presence and location of underwater objects by receiving acoustic sound waves and communicating a signal back to the vessel which is towing the array. Such arrays, however, which may extend for well over a thousand feet in length, characteristically do not assume a linear configuration when towed by a vessel, but rather extend in such a way that the depth and horizontal displacement along the towed array vary considerably.

Accordingly, in order to assure an accurate interpretation of any signal received from hydrophones along the array indicating the presence of an underwater object, it is necessary to calibrate such towed arrays so that the acoustic signal level is known and the characteristic underwater configuration of each towed array is known and taken into consideration in determining the position and characteristics of the underwater object being detected.

Various techniques have heretofore been employed to calibrate acoustic towed array devices such as the dropping of explosive devices which detonate at predetermined depths and the use of acoustic calibration devices which are lowered in the ocean and which emit a known acoustic signal. These techniques, however, have suffered from the disadvantage of not being particularly accurate and also involving considerable expense.

It is accordingly an object of the present invention to provide a system which permits the inexpensive, expeditious and accurate determination of the characteristic underwater configuration of a towed acoustic array or other elongated towed underwater device.

It is a further object of the present invention to provide a device which will permit determination of the position and functional condition of the respective hydrophone elements in a towed underwater array.

It is still a further object of the invention to provide a system which permits the calibration of depth sensors built into underwater towed arrays and to provide performance tests on each hydrophone element in such underwater towed arrays.

SUMMARY OF THE INVENTION

These and other objectives are achieved according to the present invention by providing a calibration system for towed underwater cables and acoustic arrays which comprises a cylindrical collar adapted to fit around the towed cable or array and possessing sufficient hydrodynamic drag that it will remain substantially stationary relative to the linear movement of the cable or array while the cable or array is being drawn through it. Because of its relatively low mass, the calibration collar of the invention will experience vertical and horizontal displacement corresponding to the changing configuration of the towed cable or array passing through it. A calibrated compass and pressure transducer of the collar register the respective horizontal and vertical displacement by producing electronic signals which can be stored for subsequent analysis or immediately transmitted to a receiver in a suitable location.

In one preferred embodiment of the invention the calibration collar emits continuous acoustic signals which are encoded with the signals representing the vertical and horizontal displacement of the collar and these multiplexed signals are received by each hydrophone in the array as it passes through the collar. The composite acoustic signals are received by each hydrophone and converted to electrical signals which are transmitted along the array to the surface where the towing vessel acts as the receiver and processor. When the length of the array has been towed through the collar, signals will, therefore, have been received from each hydrophone on the array giving its respective vertical and horizontal position and permitting an accurate determination of the characteristic profile of the array as it is towed through the water.

Although the individual hydrophones are spaced sufficiently close on the array that loss of data due to an inoperative hydrophone element causes little degradation in total array performance, signals received from the collar will indicate the functionality and sensitivity of each hydrophone. In addition, since the distance between each hydrophone element is fixed and known, the speed at which the towed array passes through the collar can be determined from intervals between the received signals.

It will be understood that the above described embodiment of the present invention, while preferred, in no way precludes other embodiments and adaptations of the invention. The present invention, in fact, provides a convenient device for calibrating any long towed underwater cable or for determining the characteristic configuration of such cable as it is towed through the water.

In another embodiment of the present invention, for example, it is contemplated that when the towed array or cable has been towed completely through the acoustic collar of the present invention, the device will automatically be ejected from the end of the cable and either discarded or rise to the surface where it can be recovered. A restraining device can also be attached to the end of the towed cable to prevent removal of the collar once the entire length of the towed cable has passed through it. This latter embodiment of the invention, therefore, also permits the device to be recovered when the cable is retrieved.

Although, the preferred embodiment of the present invention described above contemplates that acoustic signals will be produced by the calibration collar to transmit data on the vertical and horizontal position of the collar to the hydrophone elements located at intervals along the cable and thereby to the towing vessel, it will be apparent that other means for transmitting data from the calibration collar and receiving it in a suitable location can be practiced within the scope of the present invention. For example, it is contemplated that under some circumstances it may be desirable to transmit signals from the calibrating collar independently of the hydrophones or lines of communication disposed within the towed cable itself. Alternatively, the calibration collar can be provided with suitable recording devices which are activated, for example, as the cable begins to pass through the collar and which will record the electric signals produced by the instruments aboard the collar so that this data can be analyzed when the collar is retrieved.

It will further be appreciated, that although it is imperative that the calibration collar of the present invention possess sufficient drag in the water to maintain a relatively fixed position while the towed array is drawn through it, various configurations of the device can be employed to achieve the necessary hydrodynamic drag.

It is also contemplated that the device can be equipped with a suitable release mechanism to permit it to be released at any point along the towed cable. Such a mechanism, for example can consist of having the collar split transverse to its cross section with a hinge provided to unite the two split sections on one side and a releasable locking mechanism provided on the side of the collar opposite the hinge to permit opening of the device, for example, by remote signal or if an obstacle is encountered which interferes with passage of the towed cable through the collar.

In yet a further embodiment of the present invention it is anticipated that the calibration collar may be employed with a towed cable or array having provision, such as fins, to prevent oscillations or "strumming" of the long towed cable which frequently occurs as it is drawn through the water. Such a provision may, for example, be a collar having a slot running its length and parallel to the cable passing through the collar so that fins or other means provided on the cable to eliminate the "strumming" effect can pass through the collar without interfering with the operation. In order to assure that in fact such anti-strumming provisions on the cable are properly aligned to pass through such a slot, it may also be desirable to provide the collar with a suitable configuration to guide the collar into proper alignment with the anti-strumming device so that the fin will pass through the slot.

It will also be apparent according to the present invention that various further adaptations in the configuration of the actual towed cable or array may be desirable and are contemplated to facilitate movement of the cable through the calibrations collar. For example, it is contemplated that the cable may be provided with springloaded or other roller means to facilitate such passage through the collar. It is further contemplated that the collar may fit loosely enough around the towed cable to permit the passage of some water in a film between the inside of the collar and the towed cable to lubricate the passage and assure that the collar does not become stuck on the cable as it is drawn through the collar.

The present invention will be further appreciated by having reference to the following drawings which describe the preferred and other embodiments of the invention.

BRIEF DESCRIPTION OF THE DRAWINGS

FIG. 1 illustrates one embodiment of the device of the present invention, shown positioned on a towed underwater array.

FIG. 2 illustrates the use of the present invention to determine the characteristic configuration of a long towed underwater cable.

DETAILED DESCRIPTION OF THE DRAWINGS

Figure 3:
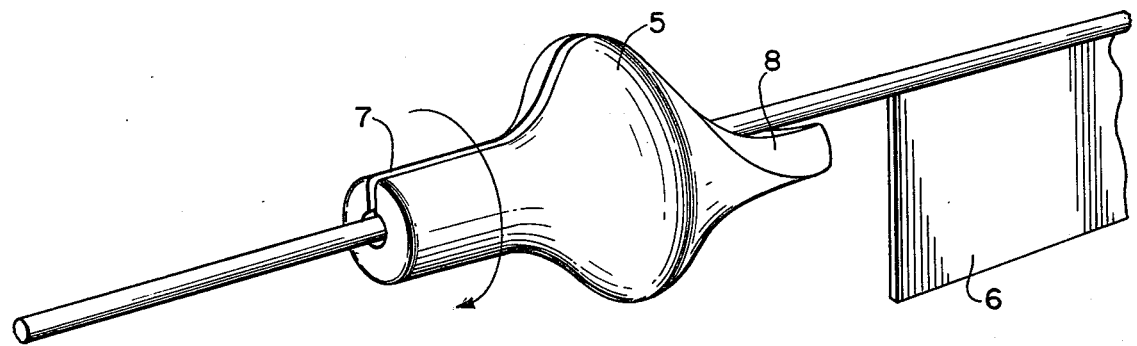
FIG. 3 illustrates the embodiment of the present invention whereby the present invention is provided with a slot and appropriately tapered on one side to accomodate stabilizing fins on the towed cable.

Directing attention to FIGS. 1 and 2 of the drawings, it will be seen that a collar (2) is shown attached around the towed cable (1) which typically is an oil filled tube, frequently of segmented construction, containing hydrophones (3) spaced along its entire length and connected to the towing vessel by a conductive cable (4) which transmits signals received by each of the hydrophones, and which will be processed to determine the presence of underwater objects. The construction of the calibration collar (2) is such that the cable (1) can be drawn through it in the direction indicated by the arrow while the collar remains essentially stationary in the water relative to the direction the cable is being drawn due to hydrodynamic drag of the collar. The relatively low mass of the collar (2) however, permits it to be displaced in a horizontal or vertical direction so that its position as the cable (1) is drawn through it. It will be seen in FIG. 2, that in fact, the long towed array or cable (1) does not assume a straight line configuration in water but rather assumes a configuration which varies in both the vertical and horizontal direction at different points. Each such towed array or cable, in fact, has a characteristic configuration that it will assume in the water as it is towed so that the determination of the position of the collar (2) as the cable is drawn through it, is an accurate profile of the characteristic configuration of that particular towed cable.

FIGS. 3 to 7 illustrate an additional embodiment of the present invention whereby, the collar 5 is provided with a slot (7) running its length to accomodate stabilizing fins (6) on the cable (1). These stabilizing fins are provided at periodic intervals along the tow cable to prevent a "strumming " or oscillating effect which occurs when the cable is drawn through the water. In order to assume that the collar (5) is in proper alignment with the fin (6) to permit the fin to pass through the slot (7). A tapered twist or incline (8) is provided on the end of the collar remote from the towing vessel to cause the collar to rotate about the cable (1) to bring the slot into proper alignment with the fin (6).

Figure 4:
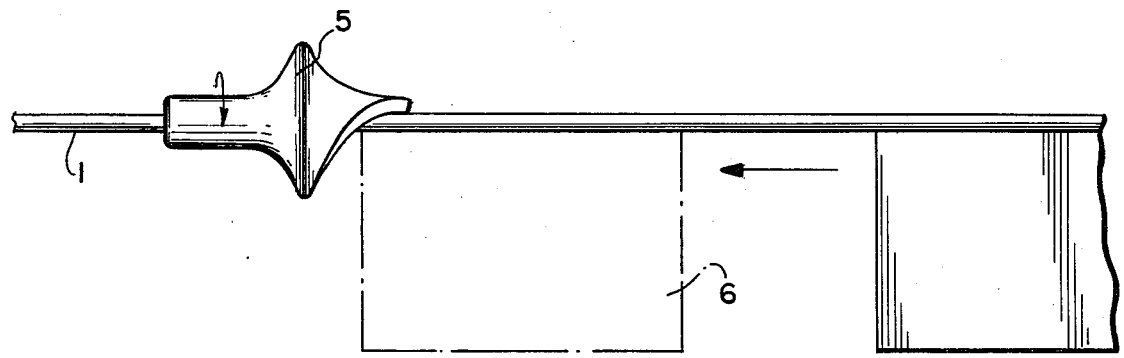
FIGS. 4 and 5 illustrate the passage of the towed cable having stabilizing fins attached through the collar of the invention.
Figure 5:
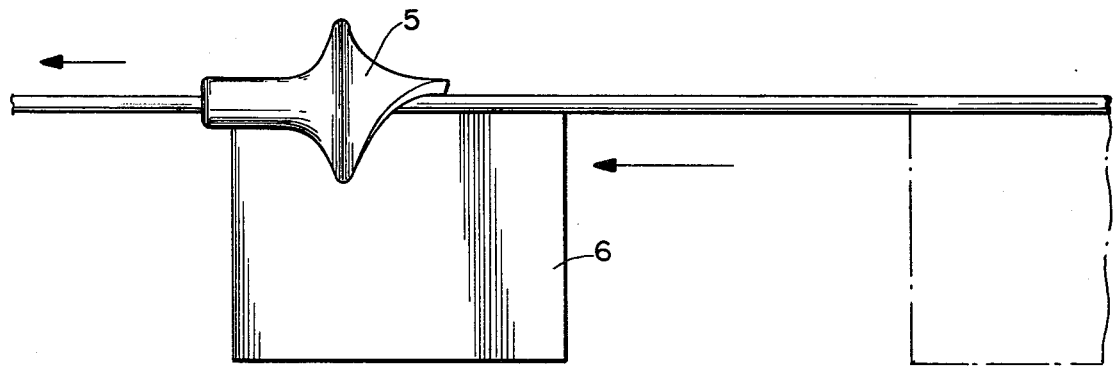

FIGS. 4 and 5 of the drawings, illustrate the initial encounter of the fin (6) with the tapered (8) end of the collar and the subsequent passage of the fin through the slot (7) as the cable is drawn through the collar.

Figure 6:
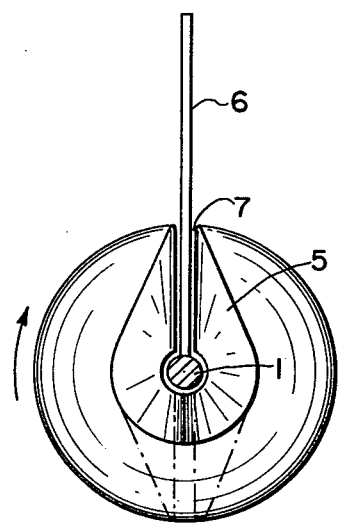
FIG. 6 is a front-end view of the slotted collar of the present invention illustrating its rotation to place it in proper alignment with the stabilizing fins attached to the towed cable.

FIG. 6 of the drawings is a front-end view illustrating the rotation of the collar both before and during passage of the fin (6) through it.

Figure 7:
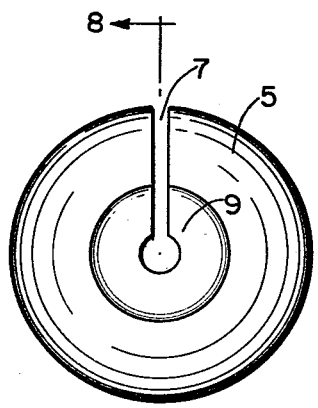
FIG. 7 is a rear-end view of the slotted collar of FIG. 6.

FIG. 7 illustrates a rear-end view of the collar shown in FIG. 6 and shows the appearance of the slot (7) and tubular passage (9) both of which run the length of the device.

Figure 8:
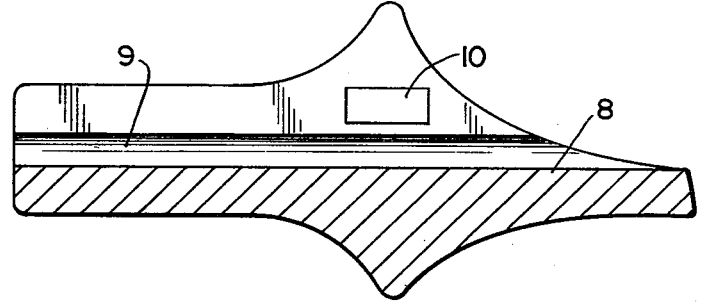
FIG. 8 is a side, cross-sectional view of the device shown in FIGS. 3 through 6.

In FIG. 8 of the drawings, the collar of the present invention, having the tapered end (8) is illustrated in cross section. The tubular passage (9) to permit drawings of the cable through the collar, is shown with instrumentation package (10) which contains the compass and pressure transducer for determining the respective horizontal and vertical positions of the collar as the cable is drawn through it. In addition the instrumentation package (10) contains the necessary power supply and transmitter including a transducer to convert the signals from the compass and pressure transducer into acoustic signals which are radiated by the collar and received by the respective hydrophone elements (3) disposed in the towed cable or array (1). These acoustic signals in which are encoded the data showing the position of the collar in the water are received by the hydrophone elements as they pass in proximity and through the collar and converted to the electrical signals which are transmitted by the conductive cable (4) through the towed array to a suitable receiver. It will, of course, be appreciated that the actual instrumentation required to accomplish this communication of signals from the calibration collar to a receiver is accomplished using conventional equipment. It should further be appreciated that the communication of signals from the calibration collar can also be carried out by other techniques or even stored within the collar by appropriate recording techniques. This stored information can be analyzed at a subsequent time.

Figure 9:
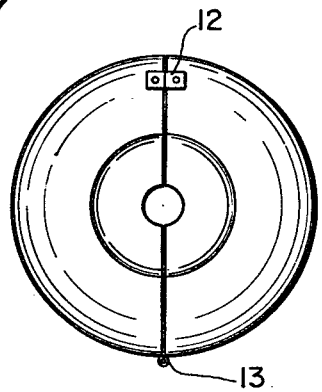
FIG. 9 is a front-end view of the device of the invention illustrating the hinged configuration of one embodiment.

FIG. 9 of the drawings shows a rear-end cut away view of the device of the present invention in which the collar is bisected transversed to its length. A hinge mechanism (13) is provided at one side of the collar to connect the two halves while a release is provided at (12) on the other side of the collar to hold the collar together. This release mechanism which may, for example, be a magnetic or mechanical device, is of suitable design so that it will release, either upon receipt of a signal transmitted, for example, through the towed cable (1) or upon encountering an obstacle which causes the calibration collar to become jammed on the towed cable. Such a device, for example, could reflect the increased hydrodynamic drag that would result when the collar is dragged along with the cable rather than remaining stationary in the water as the cable is drawn through it. Release of the mechanism (12) is accomplished, for example, by termination of electric current which maintains magnetic contact between the two halves of the collar by providing an explosive bolt or spring loaded release mechanism which is triggered by receipt of a proper signal.

It will be apparent that other modifications and embodiments are within the scope of the present invention.

It is claimed:

1. A device for determining the configuration of elongated, underwater structures as they are drawn through the water, which comprises a collar adapted to fit around a portion of said underwater structure and possessing sufficient hydrodynamic drag to remain substantially stationary in the water relative to the linear movement of the structure as the structure is drawn through the collar; said device being further adapted to assume the horizontal and vertical position in the water of that portion of said underwater structure being drawn through it; said device further comprising means for registering said horizontal and vertical displacement and communicating this information to an external location or recording it.

2. The device of claim 1, in which said elongated, underwater structure is a long tube or cable having disposed at intervals along its length means for detecting acoustic signals transmitted through the water; said collar being provided with means for communicating its horizontal and vertical displacement through said acoustic signal detecting means to a location at the surface end of said tube or cable.

3. The device of claim 2 wherein said tube or cable is provided with means spaced along its length to prevent oscillations as it is drawn through the water and said collar is provided with a slot running its length and bisecting one side of the collar to accomodate said means to prevent oscillations as the tube or cable is drawn through the collar.

4. The device of claim 3 wherein said collar is provided with means for rotating said collar around the tube or cable to align the slot to accomodate said means to prevent oscillations.

5. The device of claim 1 wherein said collar is of generally tubular configuration and provided with a mid-section of enlarged diameter transverse to the longitudinal axis to increase said hydrodynamic drag.

6. The device of claim 1, wherein said device is adapted to be retained at the submerged end of said underwater structure.

7. The device of claim 1 wherein said device is adapted to be released at the submerged end of said underwater structure.

8. The device of claim 1 which is provided with means for releasing said device from said elongated structure at any point along the length of said structure.

9. The device of claim 8 wherein said release means is activated when said device encounters an obstruction or by signal.

* * * * *